United States Patent [19]

Takano

[11] Patent Number: 4,902,265
[45] Date of Patent: Feb. 20, 1990

[54] VARIABLE SPEED PULLEY

[75] Inventor: Hiroshi Takano, Miki, Japan

[73] Assignee: Mitsuboshi Belting Ltd., Kobe, Japan

[21] Appl. No.: 239,511

[22] Filed: Sep. 1, 1988

[51] Int. Cl.⁴ .............................................. F16H 11/02
[52] U.S. Cl. ....................................................... 474/13
[58] Field of Search ..................... 474/11–13, 474/17–21, 25, 69, 70

[56] References Cited

U.S. PATENT DOCUMENTS

| | | | |
|---|---|---|---|
| 4,360,353 | 11/1982 | Hattori et al. | 474/19 X |
| 4,406,644 | 9/1983 | Kinbara et al. | 474/13 |

FOREIGN PATENT DOCUMENTS

| | | | |
|---|---|---|---|
| 0251756 | 1/1988 | European Pat. Off. | 474/13 |
| 0294265 | 12/1986 | Japan | 474/13 |

Primary Examiner—Thuy M. Bui
Attorney, Agent, or Firm—Wood, Dalton, Phillips Mason & Rowe

[57] ABSTRACT

In order to provide smoother transition for speed changes, a variable speed pulley having a movable sheave half and a fixed sheave half is provided with a torque cam. A spring biases the second sheave half axially of the first sheave to vary the width of a belt receiving groove. The torque cam forces the second sheave half in the same direction as the spring when the torque of a load operatively connected into the pulley assembly is increased. A centrifugal thrust arrangement urges the second sheave half in a direction reverse to the direction caused by the spring responsive to the rotational speed of the pulley.

23 Claims, 5 Drawing Sheets

VARIABLE SPEED PULLEY

TECHNICAL FIELD

This invention relates to power transmission belt pulleys and in particular to variable speed power transmission belt pulleys.

BACKGROUND OF THE INVENTION

In one form of conventional variable speed pulleys, a movable pulley sheave half is urged toward a fixed sheave half by a spring. When a V-belt received in the pulley groove defined by the confronting surfaces of the sheave halves is urged radially inwardly, as by an increase in tension force applied in the belt, the belt overcomes the biasing force of the spring, permitting the movable sheave to move away from the fixed sheave and thereby reduce the effective diameter of the pulley, and thereby automatically vary the speed of the pulley driven by the belt.

It has further been known to provide means for axially moving the movable sheave half as a function of the speed of the pulley. One such structure utilizes force-applying means having a variable extension parallel to the shaft axis proportional to the centrifugal force acting thereupon as a result of the speed of rotation of the pulley. As described in Takano et al. co-pending application Ser. No. 067,691, filed June 29, 1987 now U.S. Pat. No. 4,789,578, the force-applying means comprises a plurality of small spherical elements, and a spring providing a change in the relative rotational position of the surfaces for varying the arrangement of the force-applying means as an incident of relative movement between the first and second sheaves angularly about the axis of rotation.

A problem has been noted with respect to the above described pulleys. Particularly, the belt has a tendency to fall into the belt pulley with tension generated in the belt. For example, when such a variable speed pulley is used to drive auxiliary units of an automobile, it is desirable to select the speed ratio of the driver pulley versus the driven pulley to be 1.1, or slightly higher, at engine running speeds of 2000 rpm or less. Generally, however, the torque generated at the driver pulley side is high in the range between idling speed and 2000 rpm, but at speeds higher than 2000 rpm, the torque decreases sharply. Resultingly, because of belt tension, the belt falls into the belt receiving groove of the driver side variable speed pulley which causes deceleration, resulting in shortage of speed required for the driven side variable speed pulley.

It has been proposed that such problems can be eliminated, for example, by increasing the spring thrust. However, this results in the necessity of generating larger centrifugal thrusts in response to overcome the increased spring thrust.

The present invention is intended to overcome these and other problems associated with prior variable speed pulleys.

DISCLOSURE OF THE INVENTION

The present invention comprehends an improved variable speed pulley structure including a torque cam. The use of a torque cam provides for smoother speed changes.

Broadly, there is disclosed herein a variable speed pulley including a first sheave half, means for fixedly mounting the first sheave half on a rotatable shaft defining an axis of rotation, a second sheave half, and means for coaxially movably mounting the second sheave half on the shaft adjacent the first sheave half to define a belt-receiving groove therebetween. Biasing means are provided for biasing the second sheave half axially of the shaft to vary the width of the belt-receiving groove. A torque means forces the second sheave half in the same direction as urged by the biasing means when the torque of a load operatively connected to the pulley assembly is increased. A force-applying means provides a centrifugal force for urging the second sheave half in a direction reverse to the direction in which the second sheave half is biased by the biasing means.

In the illustrated embodiment, the force-applying means comprises a plurality of small spherical elements.

For facilitated uniform distribution of the force-applying means during drive operation of the pulley, lubricating means may be provided for reducing friction between the respective elements.

In the illustrated embodiment, the torque means comprises a cam-receiving notch on an extension from an inner radial sleeve of the second sheave half. A coaxial cam plate including a cam received in the notch forces the torque cam into engagement with the notch to generate thrust in the direction similar to that provided by the biasing means. Thus, the spacing between the second sheave half and the first sheave half varies, and forms the same composite thrust to be automatically self-adjustable in response to speed and torque given by the combined thrust provided by the biasing means and the torque means which is opposed by the force-applying means.

The variable speed pulley of the present invention is extremely simple and economical of construction, while yet providing the highly desirable features discussed above.

BRIEF DESCRIPTION OF THE DRAWING

Other features and advantages of the invention will be apparent from the following description taken in connection with the accompanying drawing wherein.

DESCRIPTION OF THE INVENTION

Figure 1:
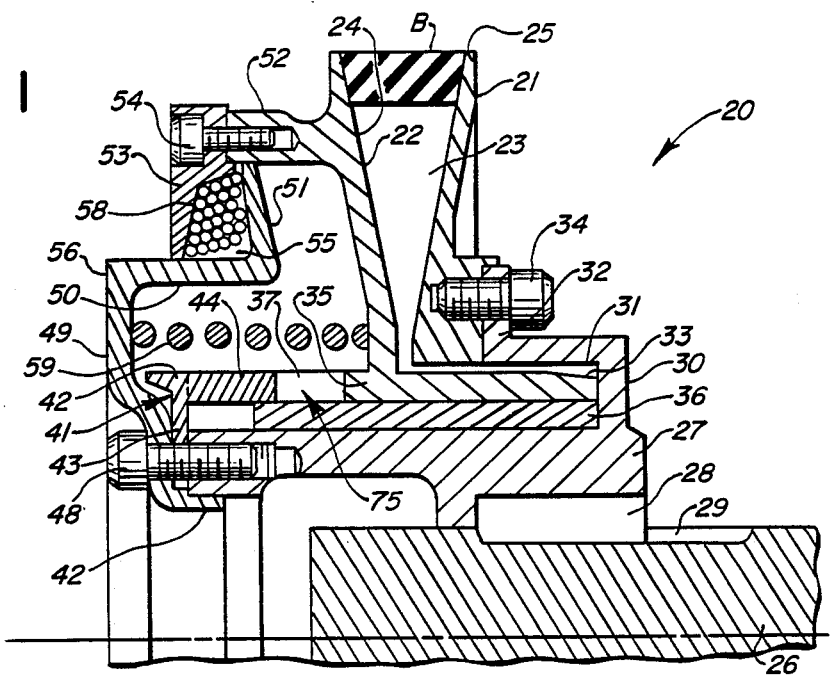
FIG. 1 is a partial sectional side elevation view of the variable speed pulley according to one embodiment of the invention, with the V-groove width at a minimum.
Figure 2:
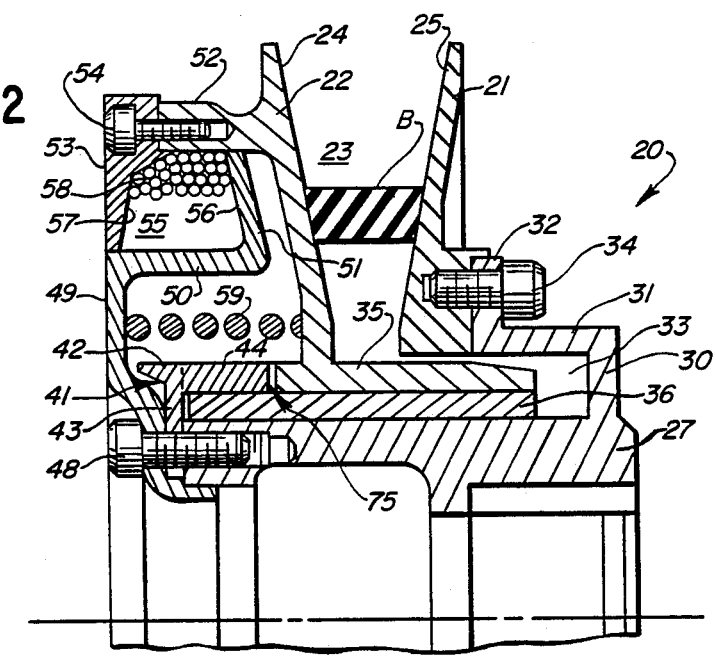
FIG. 2 is a view similar to that of FIG. 1, with the V-groove width at a maximum.

In a first illustrative embodiment of the invention as disclosed in FIGS. 1 and 2 of the drawing, a driver side variable speed pulley generally designated 20 is shown to comprise a first sheave half 21 and a second sheave half 22 having respective confronting faces 23 and 24 defining a belt-receiving V-groove 25 therebetween.

The first sheave half 21 comprises a fixed sheave half fixedly associated with a power drive shaft 26 by means of a sleeve 27 locked to the shaft 26 by a key 28 received in a keyway 29 in the shaft 26. The sleeve 27 includes a radially outwardly extending annular end wall 30 turned to a coaxial cylindrical wall 31 having an annular outturned flange 32. The sleeve 27, end wall 30, and cylindrical wall 31 define a cylindrical groove 33 therebetween. A plurality of bolts 34 extend through the annular flange 32 and are threaded into the first sheave half 21, as shown in FIGS. 1 and 2.

The second sheave half 22 comprises a movable sheave half which extends diagonally outwardly from an inner cylindrical sleeve 35. The sleeve 35 is coaxial relative to the sleeve 27, having a cylindrical sleeve bearing 36 therebetween. The sleeve 35 includes three cam receiving concave portions, or notches, 37 radially spaced approximately 120° apart. Each notch 37 includes sidewalls 38 and 39 connected by a land 40. The sidewalls 38 and 39 are oriented relative to one another at an angle $\theta$.

Figure 4:
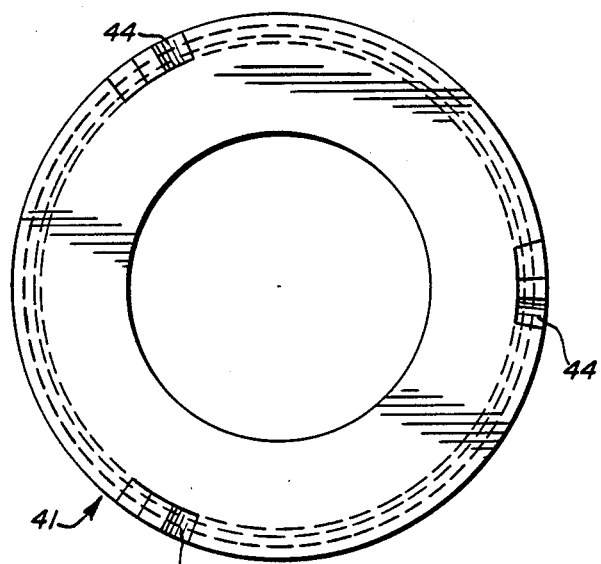
FIG. 4 is a front elevational view of a torque cam plate of the torque cam of FIG. 1.
Figure 5:
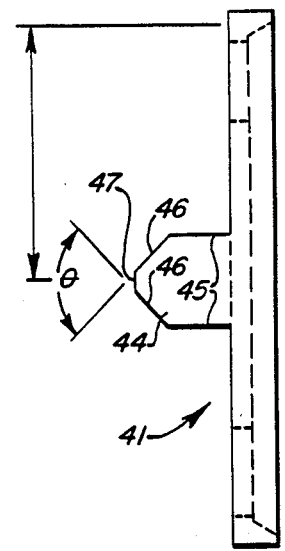
FIG. 5 is a side elevational view of the torque cam plate of FIG. 4.

Referring also to FIGS. 4 and 5, a cam plate 41 includes a cylindrical sleeve 42 having a diameter similar to that of the sleeve 35. The sleeve 42 is connected to an inwardly turned annular wall 43. The cam plate sleeve 42 includes three cams 44 radially spaced approximately 120°. Each cam 44 includes parallel sidewalls 45 turned to opposite diagonally extending walls 46 joined by a land portion 47. The angle formed by the sidewalls 46 is the angle $\theta$, similar with the notches 37. The land 47 is of a size smaller than the notch land 40.

A plurality of bolts 48 secure the cam plate 41 to the sleeve 27, with the cams 44 extending axially inwardly. Particularly, each of the three cams 44 is received in one of the notches 37. The notches 37 and cams 44 collectively define a torque cam 75.

An annular stopper 49 is fixedly secured to the sleeve 27 by the bolts 48 and, thus, is fixed against rotation and axial movement relative to the shaft 26. The stopper 49 includes a radially outer longitudinally extending cylindrical portion 50 and an outturned distal flange 51.

The second sheave half 22 also includes a radially outer cylindrical wall 52. An annular closure wall 53 is fixedly mounted to the cylindrical wall 52 by a plurality of bolts 54. A space, or chamber, 55 is formed between an axially outer facing surface 56 of the flange 51, and an axially inwardly facing surface 57 of the closure wall 53.

A centrifugal force-applying means in the form of a plurality of small rounded element 58 are provided in the space 55, which is thusly effectively enclosed by the stopper wall 50, the distal flange 51, the cylindrical wall 52, and the closure wall 53.

The second sheave half 22 is biased towards the first sheave half 21 by a helical spring 59 extending concentrically of the axis of the shaft 26.

The invention comprehends the provision of means for reducing friction between the rounded elements 58. Illustratively, a fluid lubricant may be provided in the spaces in which the spring 59 and rounded elements 58 are disposed and maintained against leakage therefrom by O-rings, not shown, as is well-known.

The force-applying means are illustrated in the drawing as comprising relatively small diameter, rounded, or spherical, elements 58. The illustrated elements may have a diameter in the range of 1 to 6 mm., and preferably, in the range of 2 to 4 mm.

The invention comprehends that the force-applying means may be particulate, such as powder and the like. The force-applying elements 58 may be formed of conventional steel, copper, stainless steel, tungsten, etc. The elements may be coated, such as with a synthetic resin, metal powder embedded in resin, or other friction-reducing means. Any suitable fluid lubricant may be utilized for reducing the friction between the elements 58, as discussed above.

In the illustrated embodiment, the elements 58 have a regular spherical shape. Elements deviating from a true spherical shape may be utilized, and have been found to further reduce bridging and uniformity of distribution.

The invention comprehends that all of the elements 58 may have the same size and shape, as well as having different shapes and sizes.

While the amount of the force-applying elements 58 may be as desired, it has been found to be advantageous to limit the amount of such material to approximately 90% of the volume of the space 55 in its smallest configuration, such as the configuration illustrated in FIG. 1.

As seen in FIGS. 1 and 2, the space 55 has a generally triangular configuration in the minimum volume arrangement, and a generally trapezoidal configuration when acting to increase the spacing between the second sheave half 22 and the first sheave half 11. Thus, as seen in FIGS. 1 and 2, the confronting surfaces 56 and 57 defining the axial opposite ends of the space 55 are equally oppositely angularly inclined to the shaft 26 of the pulley 20.

Thus, the variable speed pulley 20 illustrated in FIG. 1 shows the V-groove width between the first and second pulley halves 21 and 22 to be at a minimum. This occurs where the repulsion force of the compression spring 59 exceeds the centrifugal thrust.

Conversely, FIG. 2 illustrates the case where the thrust generated from the centrifugal force caused by the elements 58 overcomes the thrust of the compression spring 59 at high speeds, to cause the second sheave half 22 to move outwardly and axially away from the first sheave half 21, as is illustrated in FIG. 2.

In operation, at low speeds the groove width is at minimum, as illustrated in FIG. 1. Particularly, the thrust of the spring 59, and any nominal thrust produced by the torque cam 75, collectively overcome the centrifugal thrust produced by the small rounded elements 58. This results because low centrifugal force is provided at low rotational speeds. As speed increases, the thrust induced from centrifugal forces increases against the combined thrust generated from the spring 59 and the torque cam 75 so that the second sheave half 22 moves axially outwards, i.e., away from the first sheave half 21, as is illustrated in FIG. 2.

Figure 3:
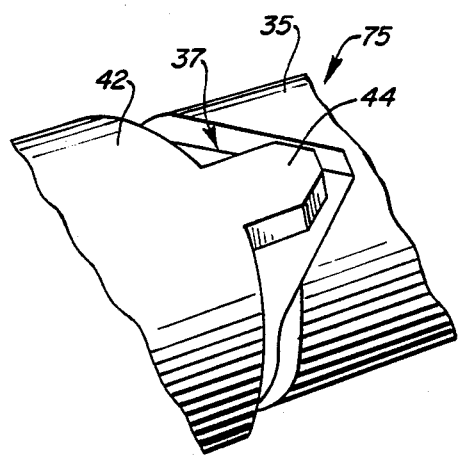
FIG. 3 is a perspective view of a torque cam of the pulley of FIG. 1.
Figure 6:
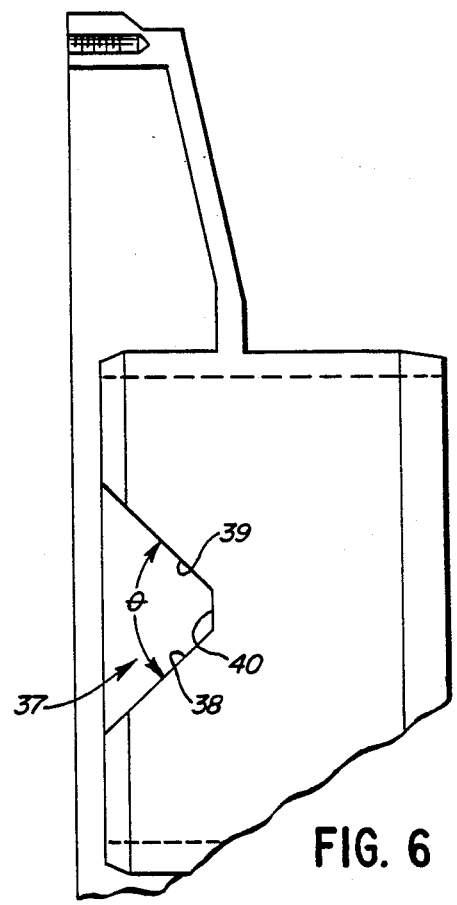
FIG. 6 is a side elevational view of a second sheave half including a torque cam-receiving groove.

If any sudden changes in speed or torque are evident, the torque cams 44 engage the walls of the associated notches 37, see FIG. 3, to produce a relative rotation, and thus axially movement, between the second sheave half 22 and the first sheave half 21. Thus, any bridging phenomenon of the centrifugal force applying means is suppressed to provide smoother speed changes. In other words, it is possible to automatically adjust the belt-speed ratio between driver and driven pulleys under more ideal conditions.

Figure 7:
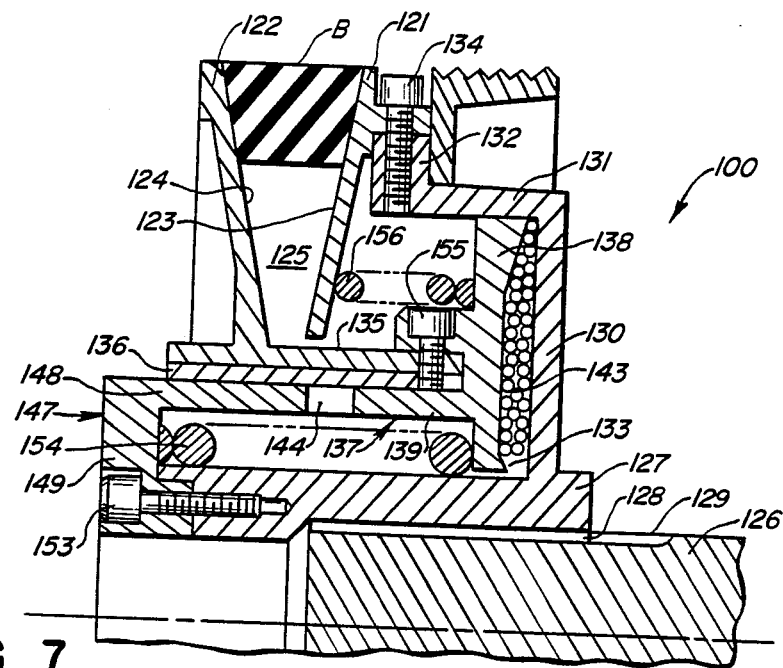
FIG. 7 is a partial sectional side elevation view of the variable speed pulley according to an alternative embodiment of the invention, with the V-groove width at a minimum.
Figure 8:
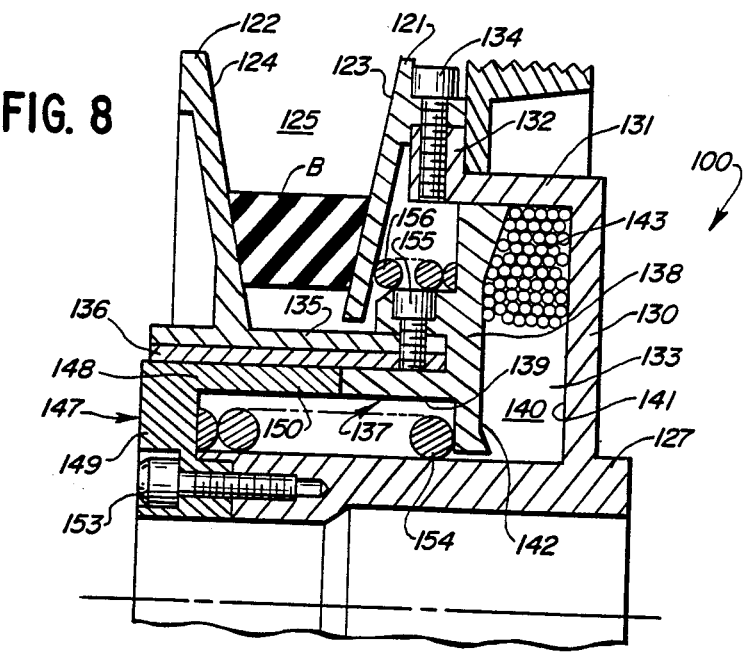
FIG. 8 is a view similar to that of FIG. 7, with the V-groove width at a maximum.
Figure 9:
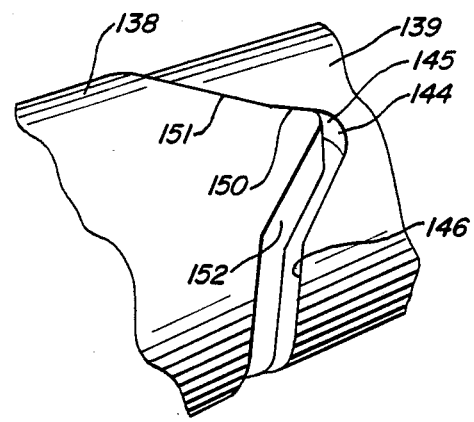
FIG. 9 is a perspective view of a torque cam of the pulley of FIG. 7.

The invention comprehends other arrangements, such as that shown in FIGS. 7–9, which illustrate a variable speed pulley 100 according to an alternative embodiment of the invention.

In the alternative illustrative embodiment of the invention the driver side variable speed pulley generally designated 100 is shown to comprise a first sheave half 121 and a second sheave half 122 having respective confronting faces 123 and 124 defining a belt-receiving V-groove 125 therebetween.

The first sheave half 121 comprises a fixed sheave half fixedly associated with a power drive shaft 126 by means of a sleeve 127 locked to the shaft 126 by a key 128 received in a keyway 129 in the shaft 126. The sleeve 127 includes a radially outwardly extending annular end wall 130 turned to a coaxial cylindrical wall 131 having an annular outturned flange 132. The sleeve 127, end wall 130, and cylindrical wall 131 define a cylindrical space 133 therebetween. A plurality of bolts 134 extend through the annular flange 132 and are threaded into the first sheave half 121, as shown in FIGS. 7 and 8.

The second sheave half 122 comprises a movable sheave half which extends diagonally outwardly from an inner cylindrical sleeve 135. The sleeve 135 is coaxial relative to the sleeve 127, having a cylindrical sleeve bearing 136 therebetween.

A stopper 137 having an annular closure wall 138 connecting a cylindrical sleeve 139 is fixedly secured to the sleeve 135 by bolts 155. The stopper 137 is received in the space 133. A chamber 140 is formed between an axially outer facing surface 141 of the wall 130, and an axially inwardly facing surface 142 of the closure wall 138.

A centrifugal force-applying means, similar to that discussed above, which may be in the form of a plurality of small rounded element 143 are provided in the space 140, which is thusly effectively enclosed by the sleeve 127, the end wall 130, the wall 131 and the closure wall 138.

The sleeve 139 includes three cam receiving concave portions, or notches, 144 radially spaced approximately 120° apart. Each notch 144 includes diagonal, connected sidewalls 145 and 146. The sidewalls 145 and 146 are oriented relative to one another at an angle θ.

A cam plate 147 includes a cylindrical sleeve 148 having a diameter similar to that of the sleeve 139. The sleeve 147 is connected to an inwardly turned annular wall 149. The cam plate sleeve 148 includes three cams 150 radially spaced approximately 120°. Each cam 150 includes connected, opposite diagonally extending sidewalls 151 and 152. The angle formed by the sidewalls 151 and 152 is the angle θ, similar with the notches 144.

A plurality of bolts 153 secure the cam plate 147 to the sleeve 127, with the cams 150 extending axially inwardly. Particularly, each of the three cams 150 is received in one of the notches 144.

The closure wall 138, and thus second sheave half 122 is biased towards the first sheave half 21 by respective first and second helical springs 154 and 155 extending concentrically of the axis of the shaft 126, respectively between each of the first sheave half 121 and the annular wall 149, and the closure wall 138.

The pulley 100 operates in a similar manner to the pulley 20, discussed above.

The invention comprehends various other arrangements such as are disclosed in Takano et al. co-pending application, Ser. No. 067,691, filed June 29, 1987, the specification of which is hereby incorporated by reference herein.

With regard to either the driver pulley 20 or the driver pulley 100, the thrust (Q) is defined by the following formula:

$$\begin{aligned} Q &= Qp + Kx + Kt \cdot Tq - \\ &\quad \frac{2\pi P\, W^2}{3} \int_{R_0}^{R_1} (R_1^3 - R_0^3) dR \\ &= Qp + Kx + Kt \cdot Tq - \\ &\quad \frac{2\pi P\, W_2}{3} \left( \frac{R_1^4 - R_0^4}{4} - R_0^3 (R_1 - R_0) \right) \end{aligned}$$

where
$Q_p$: Spring thrust of maximum pitch DIA of pulley,
K: Spring constant
$T_q$: Torque generated in movable pulley member (at torque cam portion)
p: apparent specific weight of centrifugal force-applying member
W: Angular acceleration of pulley
$R_0$: Bottom DIA of centrifugal chamber/2
$R_1$: Top DIA of centrifugal chamber /2
Kt: Torque cam ratio Assuming values are known for the variable Qp, K, P, W, $R_0$, and $R_1$, it is observed that as $T_q$ increases, Q increases proportionately. Similarly, as $T_q$ decreases, Q decreases proportionately.

The operation of such a variable speed pulley is described herein for use with driving auxiliary units in an automobile.

In an exemplary application, the variable speed pulley of the invention is used as the driver pulley at the engine side of an automobile, with a well-known spring-type variable speed pulley at the driven side. A conventional V-belt transmits forces between the two pulleys, and a conventional system is provided for driving a single or a plurality of units from the driven shaft to the auxiliary units, e.g., an alternator, a power steering pump, air compressor pump, water pump, supercharger. It is particularly advantageous to maintain a range of speed to maintain performance and fuel economy. Table 1 below shows a typical relationship between engine speed and maximum torque generated in the engine by the auxiliary units when, for example, a power steering pump and air compressor pump are driven by the above-described system.

TABLE 1

| Running Speed of Driving Shaft (r.p.m.) | Torque of Driving Shaft (Kg-m) |
|---|---|
| 1,000 | 4.9 |
| 2,000 | 4.8 |
| 3,000 | 2.9 |
| 4,000 | 1.7 |
| 5,000 | 1.2 |
| 6,000 | 1.1 |

Additionally, the torque generated in any such auxiliary units is dependent upon the operating condition of the automobile and other external conditions, as is well-known.

In order to achieve reduction of torque loss, which is the principal reason for using the variable speed pulley of the invention, it is recommended to select the speed change ratio in response to the torque generated in the auxiliary unit, as discussed below. Namely, when the torque is large, the work capacity of the auxiliary unit is required to be large. Based upon the formula as shown above, the thrust generated in the driving pulley Q (the force for the second sheave half 22 to compress the belt B from the lateral side) is:

Q=(Spring thrust at drive side)+(Torque cam thrust)−(centrifugal thrust)

wherein spring thrust at drive side=$Q_p + K \cdot x$
Torque cam thrust=$K_t \cdot T_q$.

$$\text{Centrifugal thrust} = \frac{2\pi P \, W^2}{3} \left( \frac{R_1^4 - R_0}{4} R_0^3 (R_1 - R_0) \right)$$

Meanwhile, assume the thrust of variable speed pulley at the follower side to be Q, then, Q′=(Spring thrust at follower side).

Figure 10:
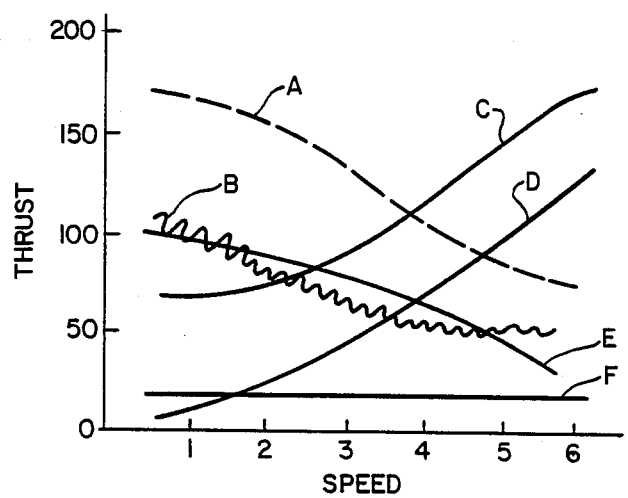
FIG. 10 is a graph illustrating the thrust for each element on the driver side variable speed pulley.

Referring to FIG. 10, a graphic diagram illustrates the spring thrust of each element at the drive side. The combined thrust, however, is a resultant thrust by setting spring thrust and torque cam thrust to be a plus (+) component, while the centrifugal thrust is set to be a minus (−) component. Moreover, when the torque in the auxiliary unit is at full load, the above-described combined thrust is shown in dotted line A, while at zero load, in a wave line B. Additionally, the figure shows spring thrust C, centrifugal thrust D (negative component), torque cam thrust E, and torque cam thrust F at no load.

Figure 11:
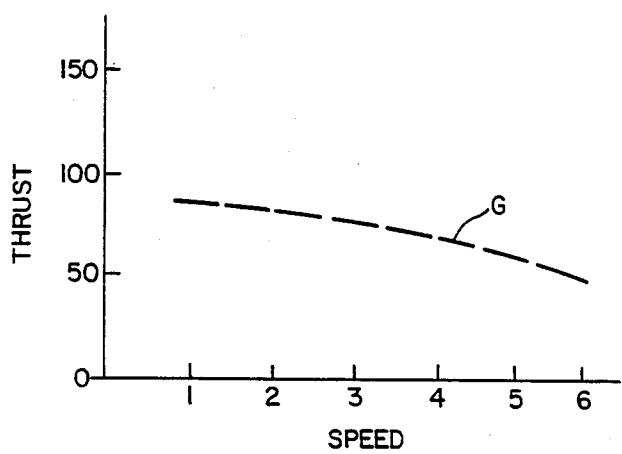
FIG. 11 is a chart showing the thrust for the driven side variable speed pulley.

Referring to FIG. 11, a graphical diagram illustrates the thrust of the variable speed driven pulley.

Figure 12:
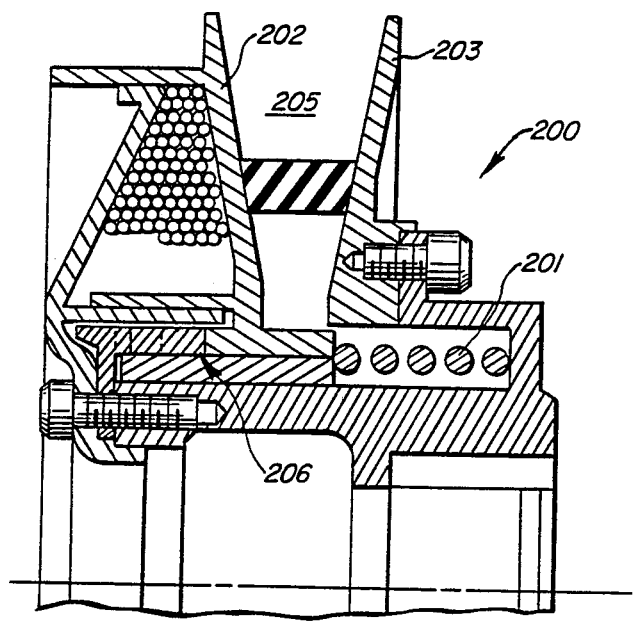
FIG. 12 is a partial sectional side elevational view of a driven side variable speed pulley according to the invention.

The principles described herein may also be utilized in a variable speed pulley to be used on the driven side. As illustrated in FIG. 12, a variable speed pulley 200 for the driven side is illustrated. The variable speed pulley 200 is generally similar in construction to the variable speed pulley 20 illustrated in FIG. 1, except that a spring 201 biases a second, or movable, sheave half 202 away from a first, or fixed, sheave half 203. Thus, the groove width 205 of the pulley is reduced by centrifugal force responsive to an increase in rotational speed of a load. In this situation, the torque cam 206 is disposed in such a configuration that it aids the force provided by the spring 201 in a direction for widening the groove width of the pulley.

We claim:

1. A variable speed pulley comprising:
a first sheave half;
means for fixedly mounting the first sheave half on a rotatable shaft defining an axis of rotation;
a second sheave half;
means for coaxially mounting said second sheave half on said shaft for rotative and axial movement on said shaft adjacent said first sheave half to define a belt receiving groove therebetween;
biasing means for biasing said second sheave half axially of the shaft to vary the width of said belt-receiving groove;
torque means for moving said second sheave half rotatively and axially of the shaft with the force of the biasing means when the torque of a load operatively connected to the pulley is increased; and
urging means for urging said second sheave half axially of the shaft against the biasing force of said biasing means with a force proportional to the speed of rotation of said shaft to vary the width of said belt-receiving groove,
said urging means comprising means movable with said second sheave half defining a movable surface,
means fixedly associated with said shaft defining a fixed surface,
force applying means extending between said movable surface and said fixed surface and having a variable extension parallel to said shaft axis proportional to the centrifugal force acting thereon as a result of said speed of rotation of the shaft.

2. The variable speed pulley of claim 1 wherein said means for biasing said second sheave half comprises means for biasing said second sheave half toward said first sheave half to reduce the width of said belt receiving groove, and said means for urging said second sheave half axially of the shaft comprises means for urging said second sheave half away from said first sheave half to increase the width of said belt receiving groove.

3. The variable speed pulley of claim 1 wherein said force applying means comprises a plurality of small discrete elements.

4. The variable speed pulley of claim 1 wherein said force applying means comprises a plurality of small spherical elements having a friction-reducing coating.

5. The variable speed pulley of claim 1 wherein said torque means comprises cam means for providing rotational and axial repositioning of said second sheave half on said shaft.

6. The variable speed pulley of claim 1 wherein said torque means comprises a cam plate fixed to the shaft and having a cam engaging a notch provided in said second sheave half.

7. A variable speed pulley comprising:
a stationary pulley sheave half mounted fixedly to a shaft;
a movable pulley sheave half mounted for rotative and axial movement on the shaft adjacent said stationary pulley sheave half and defining therewith a belt receiving groove;
torque means for moving said second sheave half rotatively and axially of the shaft when the torque of a load operatively connected to the pulley is increased;
wall means fixedly mounted to the shaft, said wall means and movable pulley sheave half defining therebetween a chamber;
small spheres in said chamber; and
means for causing said sheave halves to import distributing forces to said spheres as an incident of rotative movement of said movable sheave half on the shaft.

8. The variable speed pulley of claim 7 wherein said means for causing said sheave halves to impart distributing forces comprises spring means disposed radially inwardly of said chamber.

9. The variable speed pulley of claim 7 wherein said chamber comprises an annular chamber disposed coaxially of the shaft.

10. The variable speed pulley of claim 7 wherein said means for causing said sheave halves to impart distributing forces comprises a helical spring coaxial of the shaft and having opposite ends fixed to said fixed and movable pulley sheave halves respectively.

11. A variable speed pulley comprising:
a first sheave half;
means for fixedly mounting the first sheave half on a rotatable shaft defining an axis of rotation;
a second sheave half;
means for coaxially mounting said second sheave half on said shaft for rotative and axial movement on said shaft adjacent said first sheave half to define a belt receiving groove therebetween;
biasing means for biasing said second sheave half axially of the shaft to vary the width of said belt-receiving groove; and
torque means for moving said second sheave half rotatively and axially of the shaft with the force of the biasing means when the torque of a load operatively connected to the pulley is increased;
urging means for urging said second sheave half axially of the shaft against the biasing force of said biasing means with a force proportional to the speed of rotation of said shaft to vary the width of said belt-receiving groove,
said urging means comprising means movable with said second sheave half defining a movable surface,
means fixedly associated with said shaft defining a fixed surface and defining with said movable surface a variable volume space and,
a plurality of fluidic hard objects disposed in said space between said movable surface and said fixed surface and having a variable extension parallel to said shaft axis proportional to the centrifugal force acting thereon as a result of said speed of rotation of the shaft.

12. The variable speed pulley of claim 11 wherein said fluidic hard objects occupy substantially 90% of said variable volume space when said space defines its minimum volume.

13. The variable speed pulley of claim 11 wherein said space comprises an annular space having a triangular cross section at its minimum volume.

14. The variable speed pulley of claim 11 wherein all of said fluidic hard objects are similar in shape.

15. The variable speed pulley of claim 11 wherein said fluidic hard objects have different shapes.

16. The variable speed pulley of claim 11 wherein lubricating means is provided for lubricating said fluidic hard objects.

17. The variable speed pulley of claim 11 wherein said fluidic hard objects are formed of metal.

18. The variable speed pulley of claim 11 wherein said space comprises an annular space having a trapezoidal cross section at greater than minimum volume thereof.

19. The variable speed pulley of claim 11 wherein said surfaces defining said space comprise planar surfaces.

20. The variable speed pulley of claim 11 wherein said fluidic hard objects are spherical and have a diameter in the range of approximately 1 to 6 mm.

21. The variable speed pulley of claim 11 wherein said fluidic hard objects are spherical and have a diameter in the range of approximately 2 to 4 mm.

22. The variable speed pulley of claim 11 wherein said fluidic hard objects are provided with a coating for reducing friction therebetween.

23. The variable speed pulley of claim 11 wherein said means for biasing said second sheave half comprises means for biasing said second sheave half toward said first sheave half to reduce the width of said belt receiving groove, and said means for urging said second sheave half axially of the shaft comprises means for urging said second sheave half away from said first sheave half to increase the width of said belt receiving groove.

* * * * *